US009397348B2

(12) United States Patent
Theobald et al.

(10) Patent No.: US 9,397,348 B2
(45) Date of Patent: Jul. 19, 2016

(54) CATALYST

(75) Inventors: Brian Ronald Charles Theobald, Reading (GB); Sarah Caroline Ball, Cholsey (GB); Rachel Louise O'Malley, High Wycombe (GB); David Thompsett, Reading (GB); Graham Alan Hards, Reading (GB)

(73) Assignee: JOHNSON MATTHEY FUEL CELLS LIMITED, London (GB)

(*) Notice: Subject to any disclaimer, the term of this patent is extended or adjusted under 35 U.S.C. 154(b) by 200 days.

(21) Appl. No.: 13/814,130

(22) PCT Filed: Jul. 21, 2011

(86) PCT No.: PCT/GB2011/051386
§ 371 (c)(1),
(2), (4) Date: Apr. 22, 2013

(87) PCT Pub. No.: WO2012/017226
PCT Pub. Date: Feb. 9, 2012

(65) Prior Publication Data
US 2013/0209912 A1 Aug. 15, 2013

(30) Foreign Application Priority Data

Aug. 3, 2010 (GB) .................................. 1012982.3

(51) Int. Cl.
| H01M 4/92 | (2006.01) |
| H01M 8/08 | (2016.01) |
| H01M 8/10 | (2016.01) |
| B01J 23/64 | (2006.01) |
| B01J 23/89 | (2006.01) |
| B01J 23/648 | (2006.01) |

(52) U.S. Cl.
CPC ............ *H01M 4/921* (2013.01); *B01J 23/6486* (2013.01); *B01J 23/898* (2013.01); *H01M 8/086* (2013.01); *H01M 8/1018* (2013.01); *Y02E 60/522* (2013.01); *Y02E 60/523* (2013.01)

(58) Field of Classification Search
None
See application file for complete search history.

(56) References Cited

U.S. PATENT DOCUMENTS

| 3,274,031 | A | * | 9/1966 | Maget, Jr. et al. ............ 429/524 |
| 4,175,055 | A | | 11/1979 | Goller et al. |
| 4,185,131 | A | | 1/1980 | Goller et al. |
| 4,609,442 | A | * | 9/1986 | Tenhover et al. ............. 205/474 |
| 4,770,949 | A | * | 9/1988 | Hashimoto et al. ........... 428/687 |
| 4,868,073 | A | | 9/1989 | Hashimoto et al. |
| 5,183,713 | A | * | 2/1993 | Kunz ............................ 429/452 |
| 5,326,736 | A | | 7/1994 | Hashimoto et al. |
| 5,626,973 | A | * | 5/1997 | Takeda et al. ................. 428/822 |
| 6,331,694 | B1 | * | 12/2001 | Blankenship ........... 219/137 PS |
| 2006/0058185 | A1 | | 3/2006 | Cendak et al. |
| 2009/0069175 | A1 | * | 3/2009 | Switzer et al. ................ 502/339 |
| 2010/0292351 | A1 | * | 11/2010 | Roelofs et al. .................. 521/27 |

FOREIGN PATENT DOCUMENTS

| JP | 6-132034 A | | 5/1994 |
| JP | 07057312 A | * | 3/1995 |
| WO | WO-2006/021740 A1 | | 3/2006 |
| WO | WO-2007/067546 A2 | | 6/2007 |
| WO | WO 2009118929 A1 | * | 10/2009 |
| WO | WO-2010/092369 A1 | | 8/2010 |

OTHER PUBLICATIONS

Mulaudzi "Constitution of the Pt—Cr—Nb system" (2009)—214 pages.*
Hyde et al., "Electrocatalysis of the Hydrogen Oxidation and of the Oxygen Reduction Reactions on Pt and Some Alloys in Alkaline Medium", Electrochimica Acta, 1987, vol. 32, No. 7, pp. 995-1005.
Ball et al., "An investigation into factors affecting the stability of carbons and carbon supported platinum and platinum/cobalt alloy catalysts during 1.2 V potentiostatic hold regimes at a range of temperatures," *Journal of Power Sources*, 2007, vol. 171, pp. 18-25.
Ball et al., "PtCo, a Durable Catalyst for Automotive Proton Electrolyte Membrane Fuel Cells?" *ECS Transactions*, 2007, vol. 1, No. 1, pp. 1267-1278.
International Search Report dated Oct. 6, 2011, from PCT International Application No. PCT/GB2011/051386.
British Search Report dated Dec. 6, 2010, from British Patent Application No. 1012982.3.

* cited by examiner

*Primary Examiner* — Gregg Cantelmo
(74) *Attorney, Agent, or Firm* — Young & Thompson

(57) ABSTRACT

A platinum alloy catalyst PtXY, wherein X is a transition metal (other than platinum, palladium or iridium) and Y is a transition metal (other than platinum, palladium or iridium) which is less leachable than X in an acidic environment, has an atomic percentage in the alloy of platinum is from 20.5-40 at %, of X is from 40.5-78.5 at % X and of Y is from 1-19.5 at %.

11 Claims, No Drawings

CATALYST

CROSS-REFERENCE TO RELATED APPLICATIONS

This application is the U.S. National Phase application of PCT International Application No. PCT/GB2011/051386, filed Jul. 21, 2011, and claims priority of British Patent Application No. 1012982.3, filed Aug. 3, 2010, the disclosures of both of which are incorporated herein by reference in their entireties for all purposes.

FIELD OF THE INVENTION

The present invention relates to a novel ternary platinum alloy catalyst, and to the use of the catalyst, particularly as an oxygen reduction catalyst in fuel cells, such as a proton exchange membrane fuel cell (PEMFC).

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. In proton exchange membrane (PEM) fuel cells, the electrolyte is a solid polymeric membrane. The membrane is electronically insulating but ionically conducting. In the PEM fuel cell the membrane is proton conducting, and protons, produced at the anode, are transported across the membrane to the cathode, where they combine with oxygen to form water.

The principle component of a PEM fuel cell is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalyst coated ion-conducting membrane. Subsequently, gas diffusion layers are applied to both faces of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

Electrocatalysts for fuel oxidation and oxygen reduction are typically based on platinum or platinum alloyed with one or more other metals. The platinum or platinum alloy catalyst can be in the form of unsupported nanometer sized particles (for example metal blacks) or can be deposited as discrete very high surface area nanoparticles onto a support material (a supported catalyst). Electrocatalysts can also be in the form of coatings or extended films deposited onto a support material.

SUMMARY OF THE INVENTION

It is an object of the present invention to provide a catalyst, showing improved activity and also lifetime stability compared to state of the art catalysts when used in an electrochemical cell, particularly for use as the oxygen reduction catalyst in PEM fuel cells. There is a continual search for catalysts, particularly oxygen reduction catalysts, that have improved activity and/or stability, and that therefore utilise the expensive platinum catalyst more effectively. This enables the fuel cell performance to be increased or the loading (and therefore cost) of the catalyst to be decreased, or a combination of both benefits.

Accordingly, the present invention provides a platinum alloy catalyst PtXY, wherein X is a transition metal (other than platinum, palladium or iridium) and Y is a transition metal (other than platinum, palladium or iridium) which is less leachable than X in an acidic environment, characterised in that in the alloy the atomic percentage of platinum is from 20.5-40 at %, of X is from 40.5-78.5 at % X and of Y is from 1-19.5 at %. Suitably, the atomic percentage of platinum is from 24-30 at %, of X is from 55-72 at % and of Y is from 3-16 at %

DETAILED DESCRIPTION OF THE INVENTION

The relative leachability of a particular transition metal may be described in the context of the Thermodynamic Stability and also the Electrochemical Series; however the Practical Nobility, which includes the presence of regions of immunity and passivation across the range of pH and potential, is a better guide to the behaviour in electrochemical applications. The Pourbaix diagrams of individual metals represent a detailed mapping of the stable electrochemical phase as a function of pH and potential, allowing the stable species to be cross compared under specific conditions for different transition metals. Such diagrams may be found in the Pourbaix Atlas of Electrochemical Equilibria in Aqueous Solutions (Published by the National Association of Corrosion Engineers). This text also includes a classification of 43 different metals in order of both Thermodynamic and Practical Nobility. As an example, a subset of this order of Practical Nobility for selected metals is:

Most stable Nb=Ta>Ir~Pt>Ti>Cu>Cr>Fe>Ni>Co least stable

Thus easily leachable transition metals, for example, Co, Fe and Ni=X are stable as $X^{2+}$ or $X^{3+}$ ions under the operational conditions of the fuel cell, represented by a window at low pH<2 and potentials between 0 and 1.2V vs RHE, and therefore readily leached from the surface of nanoparticle catalysts in acidic electrolytes. In contrast, less leachable metals Cu, Cr retain immunity or are passivated over some part of the required pH and potential range, and certain elements with high stability, Ta, Nb=Y are stable in a passivated $Y_2O_5$ form within these pH and potential ranges, and precious metals also show high stability, with Pt only subject to corrosion above 0.9V in acidic conditions.

It should be noted these classifications typically relate to the behaviour of metallic substrates of the pure transition metal elements rather than the ternary nanoparticle catalysts of the invention, and thus the relative leachability of certain metals and extent of leaching may differ from the series described above once components are combined within small nanoparticle; ultimately measurements on the specific compositions are required to accurately characterise the leachability of the metals.

Suitably, the atomic percent of platinum in the alloy is from 24-30 at %.

Suitably, the atomic percent of X in the alloy is from 55-72 at % Suitably, the atomic percent of Y in the alloy is from 3-16 at %.

Suitably, X is nickel, cobalt, chromium, copper, titanium or manganese; more suitably, nickel, cobalt, chromium or copper; and preferably nickel or cobalt.

Suitably, Y is tantalum or niobium.

In one embodiment of the invention, there is provided a PtXTa alloy, wherein X is as hereinbefore defined, (suitably nickel, cobalt, chromium, copper, titanium or manganese), characterised in that the percentage of platinum is from 20.5-40 at %, of Ta is 1-19.5 at % and of X is from 40.5-78.5 at %. Suitably, the atomic percentage of platinum is from 24-30 at %, of X is from 55-72 at % and of Ta is from 3-16 at %

In a second embodiment of the invention, there is provided a PtXNb alloy, wherein X is as hereinbefore defined, (suitably nickel, cobalt, chromium, copper, titanium or manganese), characterised in that the percentage of platinum is from 20.5-40 at %, of Nb is 1-19.5 at % and of X is from 40.5-78.5%. Suitably, the atomic percentage of platinum is from 24-30 at %, of X is from 55-72 at % and of Nb is from 3-16 at %

In the present context, "at %" means atomic percentage, i.e. the percentage based on atoms or moles of the total of Pt, X and Y; any additional non-metallic components (e.g. carbon) are not taken into consideration. By the term 'alloy' we mean that there is at least some interaction and incorporation of the X and Y metals into the Pt lattice, but the incorporation (particularly of the Y metal) is not necessarily uniform throughout the whole alloy particle.

The atomic percent of the metal in the alloy may be determined by standard procedures known to those skilled in the art; for example by wet chemical analysis digestion of the sample followed by inductively coupled plasma (ICP) emission spectroscopy.

The catalyst of the invention can be used in a fuel cell as an unsupported catalyst (e.g. as a metal black) or as a supported catalyst (i.e. dispersed on a support material); preferably the catalyst of the invention is used as a supported catalyst. Suitably the amount of the PtXY alloy is 5-80 wt % based on the total weight of the supported catalyst, preferably 20-80 wt %. In a supported catalyst according to the present invention the PtXY alloy is suitably dispersed on a conductive support material, for example a conductive carbon, such as an oil furnace black, extra-conductive black, acetylene black or heat-treated and graphitised versions thereof, or carbon nanofibres or nanotubes. It may also be possible to use a non-conducting support material, such as inorganic metal oxide particles if the catalyst is deposited sufficiently well over the surface to provide the required electronic conductivity. The catalyst of the invention preferably consists essentially of the PtXY alloy dispersed on a conductive carbon material. Exemplary carbons include Akzo Nobel Ketjen EC300J, Cabot Vulcan XC72R and graphitised XC72R and Denka Acetylene Black. In one embodiment, the carbon support is a corrosion resistant carbon support. By 'corrosion resistant' we mean that the carbon material is at least 20 times more corrosion resistant than a high surface area carbon such as Akzo Nobel Ketjen EC300J and at least 10 times more corrosion resistant than Cabot Vulcan XC72R, wherein the carbon corrosion rate is determined during a potentiostatic hold test at high potential (>1V vs RHE) in an electrochemical cell. Measurement of corrosion current or rate of carbon dioxide evolution as a product of the carbon corrosion reaction can be monitored and converted to a carbon weight loss for the purposes of comparing different carbon types. Such procedures and results for different carbon types are described in J. Power Sources 171, (2007), 18-25 and references therein.

The invention further provides a method for the manufacture of the catalyst of the invention. The catalyst of the invention may be prepared by a chemical deposition from solution method involving, for example, dispersing a carbon support in water to form a slurry, and adding to this slurry, a dissolved platinum salt. Separately, a salt of component Y is dissolved a suitable solvent, such as a concentrated acid (e.g. hydrochloric acid) or an alcohol (e.g. ethanol) and added to a solution of a salt of component X. The solution containing X and Y is added to the platinum/carbon suspension. The catalyst is recovered by filtration, washed and dried. Catalyst samples are then annealed at high temperature in an inert (e.g. $N_2$) or reducing (e.g. $H_2$) atmosphere. Alternative chemical deposition methods for making the catalysts will be known to the skilled person. These include using a similar method but employing alternative platinum and base metal precursors that are soluble in hot aqueous solution. Other alkalis can be used to precipitate the metals onto the carbon support. Variations in the order of the deposition of the metals can be employed or all can be deposited simultaneously. Other chemical deposition preparations also include the incipient wetness method where the metal salts are adsorbed into the carbon support using either aqueous or organic solutions of the metal salts and the solvent removed. Yet another method is to start with a commercially available carbon supported platinum catalyst and deposit the base metals by one or other of the methods above. To form the final catalyst the materials isolated after deposition of the metals must be reduced and alloyed. This can be achieved by use of the carbothermal process where the unreduced precursor is heated in an inert atmosphere to such temperatures that reduction and alloying occurs. This step can also be carried out in a reducing (e.g. 5% $H_2$ in $N_2$) atmosphere. The methods used to prepare metal nanoparticles can also be employed. In this case the metal salts are reduced by an appropriate reducing agent such as borohydride in the presence of a surfactant and the resulting nanoparticles are adsorbed onto the carbon support. It is also possible to produce the catalyst of the invention by alternative processes to chemical deposition from solution such as physical vapour deposition (e.g. sputter coating, or vacuum evaporation), chemical vapour deposition, electrodeposition or electroless plating. With these preparation routes it may not be necessary to perform any final treatments to produce the required alloy catalyst of the invention.

Alternatively the catalyst of the invention may be prepared by a chemical deposition from solution involving, for example, dispersing a carbon support in water to form a slurry, and adding to this slurry, a salt of component Y dissolved in concentrated acid mixed with a solution of a salt of component X. The precursor material is recovered by filtration, washed and dried. The material is then annealed at high temperature in an inert (e.g. $N_2$) or reducing (e.g. $H_2$) atmosphere. This material is re-dispersed in water to form a slurry, and adding to this slurry, a dissolved platinum salt. The catalyst is recovered by filtration, washed and dried. The catalyst is then annealed at high temperature in an inert (e.g. $N_2$) or reducing (e.g. $H_2$) atmosphere.

Alternatively the catalyst of the invention may be prepared by a chemical deposition from solution involving, for example, dispersing a carbon support in water to form a slurry, and adding to this slurry, a salt of component Y dissolved in concentrated acid mixed with a solution of a salt of component X. When deposition of X and Y is complete, instead of recovering the precursor material, a dissolved Pt salt is added. The catalyst is recovered by filtration, washed and dried. The catalyst is then annealed at high temperature in an inert (e.g. $N_2$) or reducing (e.g. $H_2$) atmosphere.

Yet another method is to deposit the Pt and component Y together. The precursor material is recovered by filtration, washed and dried. The material is then annealed at high temperature in an inert (e.g. $N_2$) or reducing (e.g. $H_2$) atmosphere. This material is re-dispersed in water to form a slurry, and adding to this slurry, a dissolved salt of component X. The catalyst is recovered by filtration, washed and dried. The catalyst is then annealed at high temperature in an inert (e.g. $N_2$) atmosphere.

In a further aspect, the catalyst of the invention is subjected to an ex-situ (e.g. treating the catalyst of the invention in an acidic or basic environment or performing electrochemical cycling on the catalyst) or in-situ (e.g. carrying out electrochemical cycling of an electrode or MEA comprising a catalyst of the invention) processing treatment, resulting in leaching of the metal X from the outer layers of the catalyst particle. For example, a simple leaching of the catalyst powder in liquid acid may be employed, by stirring of the catalyst powder in 0.5M sulphuric acid at 80° C. for 24 hrs to remove the metal X, as described for $Pt_3Co$/Carbon catalysts in ECS Trans., 11(1) 1267-1278 (2007), S. C. Ball, S. L. Hudson, D. Thompsett and B. Theobald. Other methods of chemical or electrochemical leaching or dealloying of either powders or electrodes may also be employed.

Suitably 40 to 95%, preferably 40 to 90%, of metal X is leached out of the original catalyst. The presence of metal Y acts as a stabiliser and prevents complete leaching of X from the entire catalyst particle, thus resulting in a catalyst particle that is rich in Pt in the outer layers and rich in metal X in the core. Due to the removal of metal X from the outer layers, the Pt lattice in the outer layers is strained and contracted relative to a pure Pt surface resulting in enhanced activity for Oxygen Reduction. The presence of Y within the particle limits further dissolution of X from the lower layers of particle improving the long term stability of the improved activity catalyst.

The catalyst after the processing treatment is characterised by a bulk composition of 27-91 at % platinum, 3-69 at % X and 1-45 at % Y, suitably 27-85 at % platinum, 6-69 at % X and 1-42 at % Y.

Thus a further aspect of the invention provides a leached platinum alloy catalyst having a bulk composition of 27-91 at % platinum, 3-69 at % X and 1-45 at % Y, suitably 27-85 at % platinum, 6-69 at % X and 1-42 at % Y, wherein X is a transition metal (other than platinum, palladium or iridium) and Y is a transition metal (other than platinum, palladium or iridium) which is less leachable than X in an acidic environment, said leached platinum alloy catalyst obtainable by leaching 40-95% (suitably 40-90%) X from a platinum alloy catalyst PtXY, wherein X and Y are as defined for the leached platinum alloy catalyst, and wherein the atomic percentage of platinum is 20.5-40 at %, of X is 40.5-78.5 at % and of Y is 1-19.5 at %. The leaching process is carried out by either the ex situ or in situ processing treatment described above.

The catalyst material of the invention and the leached catalyst described above have particular utility as the active component in an electrode, in particular the oxygen reduction electrode (gas diffusion electrode) of an acid electrolyte fuel cell, such as the PAFC or PEMFC. In a further aspect the present invention provides an electrode comprising a catalyst according to the invention. In a preferred embodiment, the electrode is the cathode. The catalyst may be unsupported or deposited on a support, preferably an electronically conducting support. The catalyst can be deposited onto a porous gas diffusion substrate (GDS) using a range of well-established techniques. For PAFC electrodes the catalyst is usually mixed with an aqueous suspension of a hydrophobic fluoropolymer such as polytetrafluoroethylene (PTFE), to act as a polymeric binder, and the resultant flocculated material applied to the GDS by techniques such as direct filtration, filter transfer, screen printing (as described in e.g. U.S. Pat. No. 4,185,131) or dry powder vacuum deposition (as described in U.S. Pat. No. 4,175,055). For PEMFC applications the catalyst may also be formulated into an ink, comprising an aqueous and/or organic solvent, and a solution form of a proton-conducting polymer. The ink may be deposited onto the substrate using techniques such as spraying, printing and doctor blade methods.

Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

In a further embodiment of the invention, the catalyst of the invention is applied to a decal transfer substrate. Accordingly, a further aspect of the present invention provides a decal transfer substrate comprising a catalyst of the invention. The transfer substrate may be any suitable transfer substrate known to those skilled in the art but is preferably a polymeric material such as polytetrafluoroethylene (PTFE) or polypropylene (especially biaxially-oriented polypropylene, BOPP) or a polymer-coated paper such as polyurethane coated paper. The transfer substrate could also be a silicone release paper or a metal foil such as aluminium foil. The catalyst of the invention may then be transferred to a gas diffusion substrate, or in the case of application for PEMFC, to the proton-conducting membrane to form a catalyst coated membrane (CCM), by techniques known to those skilled in the art. Accordingly, a further aspect of the invention provides a catalyst coated membrane comprising a catalyst of the invention.

The electrode of the invention may be used directly in a fuel cell, for example a PEM fuel cell wherein the electrolyte is a solid proton exchange membrane. Alternatively, the electrode of the invention may be used in a phosphoric acid fuel cell wherein the electrolyte is liquid phosphoric acid in a supporting matrix, for example silicon carbide. Accordingly, a further aspect of the invention provides a fuel cell, in particular a PEM fuel cell or a phosphoric acid fuel cell, which comprises an electrode of the invention.

Although the catalyst of the invention has particular application in PEM and phosphoric acid fuel cells, and is described herein in detail with reference to this use, the catalyst has use in other fuel cells or for other applications. In particular, the catalyst of the invention may also be used in polybenzimidazole (PBI)-doped fuel cells, direct methanol fuel cells (DMFC) and alkaline electrolyte fuel cells (AFC).

EXAMPLES

The invention will now be described in more detail with reference to the following examples, which are illustrative and not limiting of the invention.

Example 1

Tantalum pentachloride (16.5 g) was dissolved in concentrated hydrochloric acid (60 ml) and added to a solution of cobalt (II) chloride (43.89 g) in water (200 ml). The resulting solution was added to a slurry of Ketjen EC300J carbon (35.00 g) dispersed in water (6 L). The stirred slurry was neutralised to pH 8 with 1M NaOH. When the pH had stabilised at 8 a solution of potassium tetrachloroplatinite (32.18 g) dissolved in water (500 ml) was added. After warming the slurry to 60° C., 1M NaOH was added until the pH stabilised at 8. The slurry was cooled, collected by filtration, washed with water and dried at 105° C. Yield=80.7 g 10.0 g of the product was annealed at 1000° C. in $N_2$ for 2 hours. Yield=7.89 g. Metal assay (wt %): Pt=21.3%, Co=15.3%, Ta=12.0% (Pt25.1:Co59.7:Ta15.2 atomic %)

Example 2

Tantalum pentachloride (5.79 g) was dissolved in concentrated hydrochloric acid (20 ml) and added to a solution of cobalt (II) chloride (54.73 g) in water (250 ml). The resulting solution was added to a slurry of KetjenEC300J carbon (35.00 g) dispersed in water (6 L). The stirred slurry was neutralised to pH 8 with 1M NaOH. When the pH had stabilised at 8 a solution of potassium tetrachloroplatinite (32.18 g) dissolved in water (500 ml) was added. After warming the slurry to 60° C., 1M NaOH was added until the pH stabilised at 8. The slurry was cooled, collected by filtration, washed with water and dried at 105° C. Yield 74.83 g 10.0 g of the product was annealed at 1000° C. in $N_2$ for 2 hours. Yield=7.66 g. Metal assay (wt %): Pt=23.3%, Co=20.3%, Ta=2.80% (Pt24.9:Co71.9:Ta3.2 atomic %)

Example 3

The sample was prepared using Tantalum pentachloride (27.5 g), cobalt (II) chloride (54.87 g) and KetjenEC300J carbon (38.34 g) using the procedure described in Examples 1 and 2 but without addition of potassium tetrachloroplatinite. 10 g of the sample was isolated and annealed under comparable conditions to Examples 1 and 2 to produce $Co_3Ta/C$ (yield=7.94 g). Platinum can then deposited using one of the deposition techniques described hereinbefore.

The invention claimed is:

1. A catalyst material, comprising a platinum alloy XPtY, wherein X is nickel, cobalt, chromium, copper, titanium or manganese and Y is tantalum or niobium,
    and wherein in the alloy the atomic percentage of platinum is from 20.5-30 at %, of X is from 40.5-78.5 at %, and of Y is from 1-19.5 at %,
    and wherein the catalyst material is supported on a conductive support material and configured for use in an electrochemical cell.

2. The catalyst material according to claim 1, wherein in the alloy the atomic percentage of platinum is from 24-30 at %.

3. The catalyst material according to claim 1, wherein in the alloy the atomic percentage of platinum is from 24-30 at %, of X is from 55-72 at % X, and Y is from 3-16 at %.

4. The catalyst material according to claim 1, wherein the platinum alloy is CoPtTa.

5. The catalyst material according to claim 1, wherein the material consists essentially of the platinum alloy XPtY, wherein X is cobalt, chromium, copper, titanium or manganese, and the atomic percentage of platinum is from 24-30 at %, of X is from 55-72 at % X, and of Y is from 3-16 at %.

6. An electrode comprising the catalyst material according to claim 1.

7. The electrode according to claim 6, wherein the electrode is a cathode.

8. A decal transfer substrate comprising the catalyst material according to claim 1.

9. A catalyst coated membrane comprising the catalyst material according to claim 1.

10. A phosphoric acid fuel cell comprising the catalyst material according to claim 1.

11. A proton exchange membrane fuel cell comprising the catalyst material according to claim 1.

* * * * *